United States Patent [19]

Darchuk

[11] 4,004,405
[45] Jan. 25, 1977

[54] FLAME RESISTANT, THERMALLY STABLE POLYVINYL CHLORIDE-POLYESTER BLENDS

[75] Inventor: Walter Darchuk, North Little Rock, Ark.

[73] Assignee: Dan River, Incorporated, Danville, Va.

[22] Filed: Mar. 4, 1974

[21] Appl. No.: 448,084

Related U.S. Application Data

[63] Continuation-in-part of Ser. No. 232,736, March 8, 1972, abandoned.

[52] U.S. Cl. .......................... 57/140 BY; 139/426 R
[51] Int. Cl.² .......................................... D02G 3/04
[58] Field of Search .......... 57/140 R, 140 BY, 264, 57/28, 139; 161/169, 170, 172, 176; 264/184; 28/72.17; 139/420 A, 426 R; 428/364–365

[56] References Cited

UNITED STATES PATENTS

| | | | |
|---|---|---|---|
| 3,388,201 | 6/1968 | Mazzolini et al. | 264/184 |
| 3,439,393 | 4/1969 | Murono | 28/72.17 |
| 3,870,590 | 3/1975 | Herwitz | 57/140 BY X |

FOREIGN PATENTS OR APPLICATIONS 866,474   4/1961   United Kingdom ........... 139/426 R Primary Examiner—Richard O. Queisser
Assistant Examiner—Charles Gorenstein
Attorney, Agent, or Firm—Fisher, Christen & Sabol

[57] ABSTRACT

Flame resistant, thermally stable yarns containing 50 to 80% by weight syndiotactic polyvinyl chloride fibers and 20 to 50% by weight polyester fibers spun together to form said yarns and fabrics made therefrom. The syndiotactic index of the polyvinyl chloride is at least 1.8 and preferably greater than about 2.

7 Claims, 1 Drawing Figure

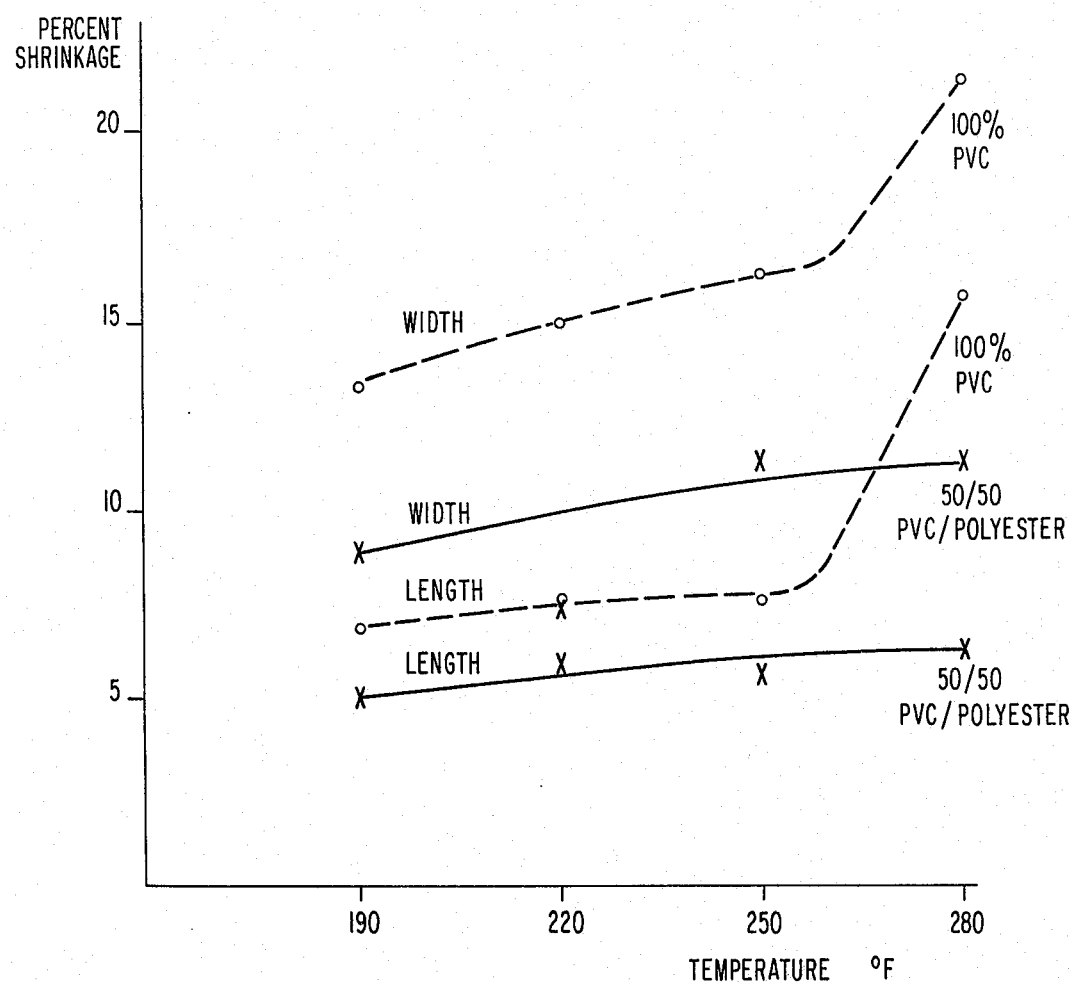

FLAME RESISTANT, THERMALLY STABLE POLYVINYL CHLORIDE-POLYESTER BLENDS

CROSS-REFERENCE TO RELATED APPLICATION

This application is a continuation-in-part of my copending application Ser. No. 232,736 filed Mar. 8, 1972, now abandoned.

BACKGROUND OF THE INVENTION

1. Field of the Invention

This invention relates to novel flame-resistant fiber blends in the form of yarns, roving, slivers, etc. and to fabrics made therefrom.

2. Description of the Prior Art

Fabric flammability has been a continuing problem in the apparel fabric industry and Federal requirements have been made considerably more stringent, especially as regards infant's and children's sleepwear. A large amount of activity has been exerted in efforts to solve the flammability problem. For example, chemical treatments have been proposed for the fabrics; however, such treatments are, in general, non-durable and tend to wash off with only a few washes. Other attempts have included variations in the types of fibers used in the yarns used to make the fabric. Conventional polyvinyl chloride is resistant to flame and has been considered to be self-extinguishing; however, it is not possible to spin fibers of conventional polyvinyl chloride at high speeds since frictional heat causes undesirable shrinkage and resulting break-outs. Also, fabrics made from such fibers shrink unduly when dyed at the elevated temperatures normally incurred during pressure dyeing and shrink very excessively when it is attempted to iron them at relatively moderate temperatures. New polyvinyl chloride polymers having a high "syndiotactic index" have recently been produced and fibers obtained therefrom. However, fabrics made solely from said fibers still exhibit the above-described disadvantages.

SUMMARY OF THE INVENTION

The present invention eliminates the danger of excessive shrinkage and undesirable break-outs and other misshaping of fabric containing polyvinyl chloride fibers by using as the polyvinyl chloride fibers a syndiotactic fiber, i.e., polyvinyl chloride fibers of high syndiotacticity or high syndiotactic index, and by blending such fibers with polyester fibers in relative amounts of 20 to 50% by weight of the polyester fibers to 50 to 80% by weight of the syndiotactic polyvinyl chloride fibers. Preferably, the amount of polyester ranges from 35 to 45% by weight and that of the syndiotactic polyvinyl chloride fibers ranges from 55 to 65% by weight.

BRIEF DESCRIPTION OF THE DRAWING

The graph in the drawing illustrates percent shrinkage at increasing temperatures of a fabric containing 50% by weight syndiotactic polyvinyl chloride fibers and 50% by weight polyester fibers and of a fabric containing 100% syndiotactic polyvinyl chloride fibers.

DESCRIPTION OF THE PREFERRED EMBODIMENTS

The type of polyester employed is not narrowly critical and preferably is of the polyethylene glycol terephthalate type although any suitable polyester fibers employed for textile uses can be used as the polyester component in this invention.

The polyvinyl chloride fibers employed in this invention are syndiotactic fibers and preferably have a high thermal stability, for example, up to 265° F. or more. Such fibers include Leavil which is made and sold by Chatillon S.p.A. Other fibers of this type are currently on the market or are expected to be introduced into the market. U.S. Pat. No. 3,388,201 describes a useful class of syndiotactic polyvinyl chloride fibers which can be used in this invention and its disclosure is incorporated herein by reference. In that patent it is disclosed that fibers obtained from conventional polyvinyl chloride (i.e. polyvinyl chloride obtained by suspension- or emulsion-polymerization in the presence of peroxidic or redox-type catalysts, at temperatures ranging from 15° to 80° C.) do not meet modern requirements for textile fibers, and that new and valuable polymers of vinyl chloride have been developed by a relatively recent technique based on a polymerization at temperatures lower than −10° C., down to −60° C. and even lower, in the presence of suitable catalysts effective at such low temperatures.

These new vinyl chloride polymers are reported to be predominantly syndiotactic in structure (e.g. J. Polymer Science 39, 1959, pp. 321–325) and have also been said to have a very low degree of lateral branching as compared with conventional polyvinyl chloride (e.g. Chem. & Ind. 1958, p. 1114). One distinguishing factor of the new polymers is the ratio of their infrared absorption bands D635 and D693 (see J.A.C.S. 82, 1960, p. 749). The determination of said ratio is performed by means set forth in U.S. Pat. No. 3,388,201. Conventional polyvinyl chloride exhibits a D635 to D693 absorption ratio of about 1.4–1.6 whereas the new polymers exhibit a D635 to D693 absorption ratio of at least 1.8 (and even 3.0). This measurable infrared band absorption ratio is herein referred to as "syndiotactic index". Several methods and catalysts for obtaining the above-mentioned polyvinyl chloride are described in the literature. The terms "syndiotactic polyvinyl chloride" and "polyvinyl chloride of high syndiotacticity or high syndiotactic index" as used in the instant specification and in the claims relates to (a) vinyl chloride homopolymers prepared at temperatures of from −10° to −60° C. and having an intrinsic viscosity ($\eta$) greater than 0.7 dl./gr. and a syndiotactic index of at least 1.8 and preferably greater than about 2 (the syndiotactic index being defined by the ratio between the absorption of the infrared bands D635 cm.$^{-1}$, and D692 cm.$^{-1}$, as described by Fordham, Burleigh and Sturm, J. Polymer Sci., vol. XLI, pages 73–82, 1959) and (b) copolymers or polymer mixtures containing at least 85% by weight of vinyl chloride and satisfying these conditions. Particularly suitable under this aspect are, for example, copolymers of vinyl chloride containing not more than 15% vinyl-type monomers such as vinyl acetate, methyl acrylate or vinylidene chloride, prepared by the hereinbefore mentioned low-temperature polymerization technique at temperatures lower than −10° C. (preferably between −20° and −60° C.). The presence of small amounts of said vinyl-type monomers improves the dye-ability of the obtained fibers with disperse dyestuffs. Similarly, acidic monomers such as cynnamic acid, itaconic acid, acrylic acid, sodium-p-sulfoxy-phenyl-vinyl ether and other carboxylic or sulphonic monomers may be introduced in a proportion up to about 2% by weight, to impart to the resulting copolymer receptivity towards basic dyes. Receptivity towards acidic dyes is imparted by compounding a syndiotactic polyvinyl chloride with cyclohexanone-soluble polymers or copolymers containing basic groups in their molecular structure, provided the amount of such polymers or copolymers is below 15% by weight; a 50/50 copolymer of acrylonitrile and 2-methyl-5-vinyl-pyridine, for example, is suitable to that end.

The second order transition temperature ($T_g$) of a syndiotactic polyvinyl chloride generally exceeds 90°–100° C. and $T_g$ values of about 110° C. and even higher are not unfrequent. The $T_g$ value of a conventional polyvinyl chloride, on the other hand, is about 78° C. (J. of Polymer Science, vol. 56, 1962, pp. 225–231). Furthermore, while conventional polyvinyl chloride is readily permanently deformed at temperatures exceeding its $T_g$ value already under extremely low loads, syndiotactic polyvinyl chloride maintains a considerable mechanical resistance at temperatures exceeding its $T_g$ value. Moreover, syndiotactic polyvinyl chloride dissolves in only some of the solvents of conventional polyvinyl chloride. For example, it is dissovled by cyclohexanone, dimethylformamide and dimethylacetamide at temperatures not lower than about 100° C., and is not dissolved by acetone-carbon disulfide mixtures, tetrahydrofurane, dioxane, even by operating at the boiling temperatures of the latter solvents.

It has been quite unexpectedly found that when polyester fibers and syndiotactic polyvinyl chloride fibers are blended, carded, drawn and spun in the amounts of 20 to 50% by weight polyester and 50 to 80% by weight syndiotactic polyvinyl chloride, the resulting yarn is very readily spun without undue break-outs or other damage to the yarn because of frictional heat. Higher speeds may be used in spinning the blends to form yarn. Also, yarns produced in accordance with this invention are more uniform and are more readily converted into fabrics without undue breakages or other damage to the yarn or fabric. Moreover, the yarns are more homogeneous and can be dyed with a single dye without producing variegated effects or frosting. Fabrics produced from the yarns are thermally shrink-resistant and can be heated to temperatures as high as 280° F. without undue shrinkage. Because of their thermal stability yarns and fabrics according to this invention can be dyed in high pressure becks which utilize dyeing temperatures of 250° to 265° F. The yarns of this invention are homogeneous blends which show little or no separation or layering of the different types of fibers.

EXAMPLE 1

In this example, 80 pounds of syndiotactic polyvinyl chloride having a thermal stability of up to 265° F. and sold by Chatillon S.p.A. under the trademark Leavil and 20 pounds of polyethylene glycol terephthalate polyester (DuPont's Dacron) were blended in a conventional manner. The staple fibers were found to mix very well to provide a substantially homogeneous blend which showed substantially no separation or layering of the different types of fibers. The resulting blend was carded on a card machine, drawn and spun to provide a yarn, 20/1's (cotton count system). No break-outs were experienced in spinning the blend at high speed and no other difficulties were experienced. The resulting yarn was knitted on a Lawson circular knitter to produce a fabric tube which was then slit to provide a flat fabric. The yarn experienced no damage or heat shrinkage and there were no problems encountered in converting the yarn into fabric. The resulting fabric was tested in the vertical flame test (NFPA-701) and also tested by the limiting oxygen index method. The following results were obtained in the vertical flame test. After application of the flame for three seconds and removal thereof there was no residual flame on the fabric. Also the char length was 2.4 inches. The limiting oxygen index was found to be 0.328, designating that the fabric would not burn even in mixtures containing as much as 32.8% oxygen.

The resulting fabric could be dyed or finished at relatively high temperatures, e.g., 260° to 265° F. and could be subjected to such high temperatures in ironing or ovens during or after the manufacture of garments therefrom.

The above test result figures represent the averages of at least five runs for each type of test.

EXAMPLE 2

The procedure described in Example 1 was employed utilizing, however, 50% by weight of Leavil polyvinyl chloride textile fibers and 50% by weight of polyethylene glycol terephthalate polyester (Fortrel made and sold by Fiber Industries, Inc.) and except that in this case the blend was spun into a 24/1's yarn (cotton count system).

The fibers blended very well to provide a homogeneous blend with no substantial separation of the different types of fibers and layering thereof. During spinning no break-outs were experienced and the yarn was not damaged due to frictional heat incurred during the high speed operation. The yarn was not damaged during the knitting operation and the resulting flat knitted fabric was subjected to flame testing. There was no residual flame and the char length was found to be 2.7 inches. The limiting oxygen index was found to be 0.289, meaning that the fabric would not support combustion in an atmosphere containing as much as 28.9% oxygen.

The above test result figures represent the averages of at least five runs for each type of test.

The fabric was dyed with various dispersed dyestuffs including Dupont's Latyl Brilliant Blue BGA, Sodyl Brown 3RL, Sandoz's Foron Blue S-BGL, Bayer's Resolin Red FB, and Geigy's Setacyl Yellow P-GSL using dyeing temperatures ranging from atmospheric temperature, i.e., 212° F. up to pressure dyeing temperatures, e.g., 250° F. The fabric incurred no damage whatsoever and was dyed evenly throughout demonstrating a substantially equal exhaustion rate of the dye on both types of fibers. The resulting fabric did not show any frosting effects or any other disadvantageous effects.

Portions of the fabric were then exposed in hot air ovens to different temperatures as shown in Table 1 below. In each case the fabric was brought up to the designated temperature and held there for 4½ minutes.

TABLE I

| Temperature | Percent Shrinkage | |
|---|---|---|
| | Width | Length |
| 190° F. | 8.8 | 5.0 |
| 220° F. | 7.4 | 5.9 |
| 250° F. | 11.2 | 5.6 |
| 280° F. | 11.2 | 6.2 |

The above results represent averages of three test samples. One test sample at the 280° F. temperature was returned to the oven after shrinkage measurements and held at 280° F. for 10 minutes. The percent shrinkage in width was found to be 13.6 and in length was found to be 6.9 showing that the fabric had substantially stabilized during the initial hot air soak.

An identically constructed fabric made of 100% Leavil textile yarns was subjected to the same hot air shrinkage test. The results of these tests are listed in Table II below.

TABLE II

| Temperatures | Percent Shrinkage | |
|---|---|---|
| | Width | Length |
| 190° F. | 13.2 | 6.9 |
| 220° F. | 15.0 | 7.5 |
| 250° F. | 16.2 | 7.5 |
| 280° F. | 21.2 | 15.6 |

The results of Tables I and II have been plotted and the resulting plot is shown in the drawing. This data and the graph in the drawing clearly show that the novel blends of the present invention are stable to high temperatures in excess of 280° F. with negligible increase in shrinkage whereas the fabrics constructed of 100% syndiotactic polyvinyl chloride textile fibers (Leavil) increase sharply at a little above 250° F.

In addition, both types of fabrics were subjected to pressing with a hot hand iron (temperatures of approximately 330° to 350° F.) and it was found that the 100% Leavil fabrics shrank severely before the iron even touched the fabric thus designating it as a non-ironable fabric. The Leavil/polyester blend fabric, however, stood up very well under the hot iron pressing and showed no observable shrinkage during normal contact times.

EXAMPLE 3

The same procedure as described in Example 1 was employed utilizing, however, 60% by weight of Leavil textile fibers and 40% by weight of polyethylene glycol terephthalate polyester textile fibers (Kodel 411 manufactured by Eastman Chemical Products, Inc.). The different types of fibers blended very readily to provide a homogeneous blend without separation or layering thereof. No break-outs were experienced during the high speed spinning operation and the resulting yarn (20/1's) underwent the knitting operation without any difficulty and without breakages to provide a knitted fabric which was tested as described in Example 1. The vertical flame test showed no residual flame after removal of the original flame and an average char length of 2.6 inches. The limiting oxygen index was found to be 0.293 meaning that the fabric would not support combustion in an atmosphere containing as much as 29.3% oxygen.

The above test result figures represent the averages of at least five runs for each type of test.

EXAMPLE 4

The procedures described in Example 1 were carried out using 68% by weight of Leavil textile fibers and 32% by weight of Dacron polyester fibers and in which a yarn of 18/1's (cotton count system) was made.

The resulting knitted fabric was subjected to the vertical flame test and no residual flame was found after removal of the original flame and the char length was found to be 2.7 inches. The limiting oxygen index for the fabric was found to be 0.297, meaning that the fabric would not burn in an atmosphere containing as much as 29.7% oxygen. The above test result figures represent the averages of at least five runs.

EXAMPLE 5

The procedures described in Example 1 were carried out using 65% by weight of syndiotactic polyvinyl chloride fibers which are described in Example 1 of U.S. Pat. No. 3,388,201 and 35% by weight of Dacron polyester fibers. The resulting knitted fabric is suitable for the manufacture of garments and is flame resistant.

What is claimed is:

1. A fabric for garment use formed solely from a blended yarn consisting of not less than 50% and not more than 80% by weight of syndiotactic polyvinyl chloride textile fibers and 20 to 50% by weight polyethylene glycol terephthalate fibers spun together to provide a yarn having a thermal stability of 265° F. or more, superior spinning and finishing qualities, shrink back and flame resistance.

2. Fabric as claimed in claim 1 wherein said blended yarn consists of 65% by weight syndiotactic polyvinyl chloride textile fibers and 35% by weight polyethylene glycol terephthalate fibers.

3. Fabric as claimed in claim 1 wherein said blended yarn consists of 80% by weight syndiotactic polyvinyl chloride textile fibers and 20% by weight polyethylene glycol terephthalate fibers.

4. Fabric as claimed in claim 1 wherein said blended yarn consists of 60% by weight syndiotactic polyvinyl chloride textile fibers and 40% by weight polyethylene glycol terephthalate fibers.

5. Fabric as claimed in claim 1 wherein said blended yarn consists of 50% by weight syndiotactic polyvinyl chloride textile fibers and 50% by weight polyethylene glycol terephthalate fibers.

6. Fabric as claimed in claim 1 wherein said syndiotactic polyvinyl chloride has a syndiotactic index of at least 1.8.

7. Fabric as claimed in claim 1 wherein said syndiotactic polyvinyl chloride has a syndiotactic index greater than about 2.

* * * * *